(12) United States Patent
Smith, Jr.

(10) Patent No.: US 7,161,529 B1
(45) Date of Patent: Jan. 9, 2007

(54) DUAL FORWARD SCATTERING METHOD FOR MODELING MULTIPATH PROPAGATION

(75) Inventor: Jerry Rosson Smith, Jr., Arlington, VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 127 days.

(21) Appl. No.: 10/856,359

(22) Filed: May 27, 2004

Related U.S. Application Data

(60) Provisional application No. 60/475,778, filed on Jun. 5, 2003, provisional application No. 60/475,787, filed on Jun. 5, 2003.

(51) Int. Cl.
*G01S 7/292* (2006.01)

(52) U.S. Cl. .................. 342/159; 342/162; 342/89; 342/95; 342/108; 342/148

(58) Field of Classification Search ............ 342/62–65, 342/89–103, 108, 123, 125, 126, 145–149, 342/159–162, 189, 195
See application file for complete search history.

(56) References Cited

U.S. PATENT DOCUMENTS

| | | | | |
|---|---|---|---|---|
| 3,189,900 A | * | 6/1965 | Raabe | 342/74 |
| 3,924,236 A | * | 12/1975 | Earp et al. | 342/147 |
| 4,005,421 A | * | 1/1977 | Dax | 342/148 |
| 4,060,807 A | * | 11/1977 | Barton | 342/148 |
| 4,316,191 A | * | 2/1982 | Sawatari et al. | 342/91 |
| 4,435,709 A | * | 3/1984 | Kipp | 342/101 |
| 4,472,718 A | * | 9/1984 | Ohashi et al. | 342/148 |
| 4,553,146 A | * | 11/1985 | Butler | 342/379 |
| 5,003,313 A | * | 3/1991 | Doriath | 342/152 |
| 5,270,718 A | * | 12/1993 | DiDomizio | 342/147 |
| 5,710,977 A | | 1/1998 | Nakazawa | 455/65 |
| 6,175,811 B1 | | 1/2001 | Tekinay | 702/71 |
| 6,272,350 B1 | | 8/2001 | Tekinay | 455/506 |
| 6,567,567 B1 | | 5/2003 | Levin et al. | 382/284 |

OTHER PUBLICATIONS

"Multipath and ground clutter analysis for a UWB noise radar", Dawood-N; Narayanan-R-M, IEEE-Transactions-on-Aerospace-and-Electronic-Systems (USA), vol. 38, No. 3, p. 838-53, Jul. 2002.*

(Continued)

*Primary Examiner*—John B. Sotomayor
(74) *Attorney, Agent, or Firm*—Howard Kaiser

(57) ABSTRACT

Analysis of electromagnetic (or acoustic) multipath propagation inventively focuses upon the transmitter-to-target propagation (transmitted propagation reaching target via both direct pathway and forward scattered pathway) and the target-to-receiver propagation (re-transmitted propagation reaching receiver via both direct pathway and forward scattered pathway). Transmitter-to-target propagation is calculated using conventional multipath modeling technique. The target's overall scattered field is calculated using the calculated transmitter-to-target propagation in conjunction with qualitative electromagnetic/acoustic target information. Target-to-receiver propagation is calculated using conventional multipath modeling technique and/or the reciprocity principle as applied to the calculated transmitter-to-target propagation. Jointly disclosed (practicable therewith or thereapart) is inventive confinement of the assessment of multipath propagation to a "surface interactive region" ("SIR"), intermediate the target and transmitter and/or the target and receiver. The down range time of the propagation, translatable to range distance, is related to error associated with such restriction. A SIR scope is selected commensurately with acceptable error.

20 Claims, 14 Drawing Sheets

OTHER PUBLICATIONS

"A new signal subspace approach for angle of arrival estimation in radar low-angle environment", Gao Shi-wei; Bao Zheng, Acoustics, Speech, and Signal Processing, 1988. ICASSP-88., 1988 International Conference on Apr. 11-14, 1988 P(s):1232-1235 vol. 2.*

"Direction finding in the presence of fully correlated specular multipath", Ballance, W.P.; Jaffer, A.G. Acoustics, Speech, and Signal Processing, 1988. ICASSP-88., 1988 International Conference on Apr. 11-14, 1988 page(s):2849-2852 vol. 5.*

"Multi-resolution multi-frequency analysis of high range resolution sea reflections", Rice, D.E., Radar Clutter and Multipath Propagation, IEE Colloquium on Apr. 17, 1989 page(s):10/1-10/8.*

"Radar performance in a maritime environment: single hit detection in the presence of multipath fading and non-Rayleigh sea clutter"; Tough, R.J.A.; Baker, C.J.; Pink, J.M., Radar and Signal Proc., IEE Proceedings F, vol. 137, Issue 1, Feb. 1990 p(s):33-40.*

"A spatial temporal dynamical model for multipath scattering from the sea", Leung, H.; Lo, T., Geoscience and Remote Sensing, IEEE Transactions on, vol. 33, Issue 2, Mar. 1995 page(s):441-448.*

"Measurement and analysis of multipath by a rough surface reflector using a digital array antenna", Bjorklund, S.; et al, Signal Processing and Its Applications, 1999, ISSPA '99. Procs of the Fifth Int'l Symposium on vol. 2, 1999 P(s):859-862.*

"Investigation on low-angle tracking technique for HRR radar", Shang She; Zhang Shouhong; Zhang Xiushe, Radar, 2001 CIE International Conference on, Proceedings2001 page(s):839-842.*

U.S. nonprovisional Appl. No. 10/856,358, filed May 27, 2004, invention entitled "Surface Interaction Region Methodology for Delimiting Multipath Propagation Inquiry," inventor Jerry Rosson Smith, Jr.

* cited by examiner

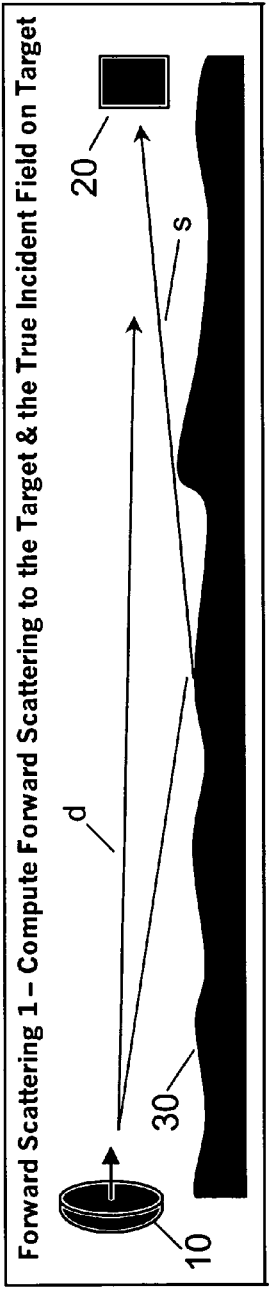
FIG. 3A — Forward Scattering 1 – Compute Forward Scattering to the Target & the True Incident Field on Target
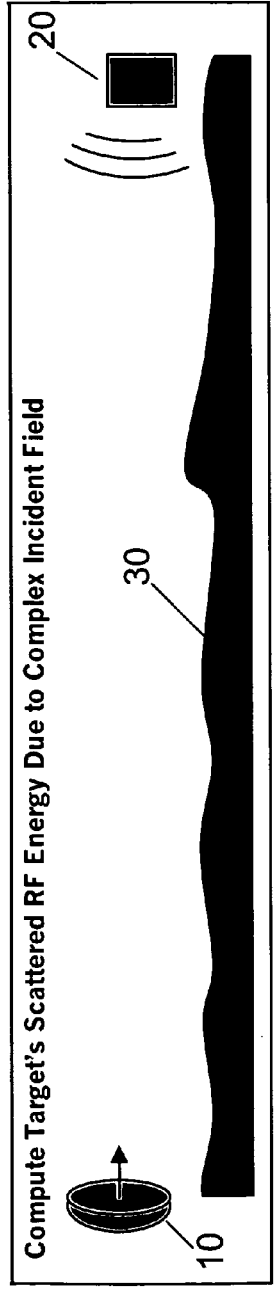
FIG. 3B — Compute Target's Scattered RF Energy Due to Complex Incident Field
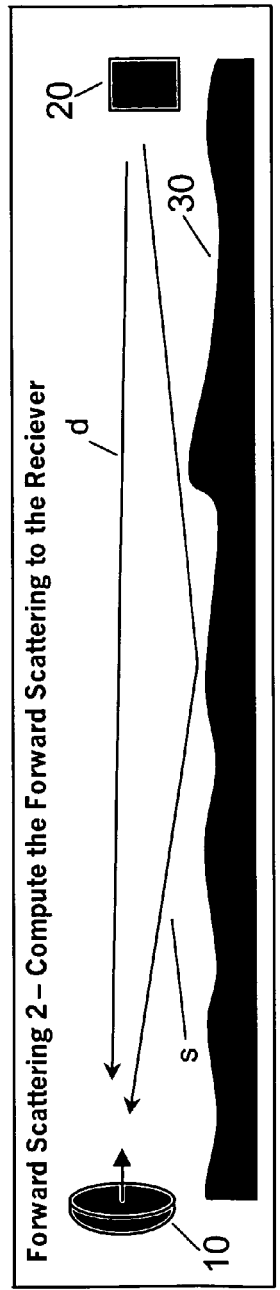
FIG. 3C — Forward Scattering 2 – Compute the Forward Scattering to the Reciever

PSEUDO-PHYSICAL OPTICS (PPO) METHOD

The PPO method is essentially an extension of plane-wave scattering from an infinite plane. It assumes a moderately rough scattering surface, can account for the finite conductivity and impedance of the sea surface, and does not require detailed a priori knowledge of the sea's profile. The governing equation for the PPO method is given in Equation 1. Note that in Equation 1, $P_{tot}$ is the total power at the receiver, $E(t)$ is the radar pulse shape, $G$ is the target's RCS for the various ray paths, and $t_1$ and $t_2$ are the time delays for the one and two sea bounce paths respectively. This method can be recast in the frequency domain by performing a Fourier transformation on the above equation. However, algorithms to calculate the reflection coefficient $p$ do not match all of the historical datasets. Typically, the $p$ coefficient is selected to match a specific dataset of interest (e.g., a specific sea state and direction).

PSEUDO-PHYSICAL OPTICS (PPO) METHOD (BRITISH FORMULATION)

The British approach to the PPO method is very similar to the traditional PPO method except that it separates the sea-bounce contributions into coherent ($r_{coh}$) component and incoherent or diffuse ($r_{dif}$) component with random phase. The governing equation for this formulation is given in Equation 2. For Equation 2, $P_T$ and $P_R$ are the total power transmitted and received respectively, $g_0$, $g_1$ are the target's RCS coefficients, $D$ is a spherical earth term, $f$ is a phase shift due to finite conductivity of the sea, and $x$ is a random phase term. Note that the coherent component does not contain a phase portion that is shifted by $4kDz/d$, implying that this formulation assumes that the two-sea bounce path has no coherency. Furthermore, the two-sea bounce path terms do not contain any characteristics of the scatterer. The associated methodology for calculating the coefficients assumes that the scattering is from a moderately rough, Gaussian distributed (not PM) sea surface. The diffuse coefficient is empirically derived to match a specific British dataset. This formulation has the same strengths and shortcomings of the PPO method.

PARABOLIZED MAXWELL EQUATIONS (DIFFUSION METHOD)

The parabolic method of forward scattering simplifies Maxwell equations into a parabolic or field diffusion form. This method has been extensively used in optics to calculate beam patterns and propagation effects in slowly changing media. Because the governing equations have been approximated as parabolic equations, fast Initial Value (IV) marching techniques can be used to solve the forward scattering solution. However, the approximations used in the formulation of the governing equations are valid for slowly spatially varying boundary conditions ($l_{em} << l_{hydro}$) or boundary conditions that appear constant ($l_{em} >> l_{hydro}$). In the intermediate region, the approach breaks down or loses computational efficiency. For reference, radar wavelengths of interest range from 0.5 inches (Ku Band) to 12 inches (L-band). This technique requires a priori knowledge of the sea surface and a statistical ensemble to generate forward scattering statistics. The U.S. Navy's SPAWAR has been developing a 2-D program utilizing the parabolic approximations, but it has not yet been validated against the ONR/LID database. Reformulation of the method of a full 3-D problem is currently under development.

FIG. 6A

| |
|---|
| FINITE ELEMENT METHOD (FEM) |
| The Finite Element Analysis is a rigorous, first-principles approach that casts Maxwell's Equations in terms of a volumetric integral over the entire space of interest. It then subdivides the volume into a collection of "finite" volume elements and does field matching at the nodes of the adjacent elements. This approach results in a large, but sparse, solution matrix. Volumes mesh sizes are typically on the order of l/6 (~ 0.2 inch for X-band), and thereby generate matrices too large to handle full-scale, 3-D ship problems. A 2-D FEM formulation could be used to analyze special FS/MP cases but would require a statistical ensemble of sea surfaces to build a reliable set of FS/MP statistics for analysis. |
| METHOD OF MOMENTS (MOM) BOUNDARY INTEGRAL METHOD |
| The Method of Moments is a rigorous, first-principles approach that solves for the surface currents by casting Maxwell's equations as an integral equation on the bounding surfaces. This method, while "numerically exact," is computationally expensive because it creates a fully populated solution matrix. Mesh sizes are on the order of l/20 (~0.05 inches for X-band) and thereby generate matrices too large for real, 3-D ship problems. MoM is typically applied to free-space targets of less then 10 wavelengths in size. The greatest benefit of the MoM solution is that once a matrix is inverted, it can be used to solve the scattered field for any viewing angle. A 2-D MoM formulation could be used to analyze special FS/MP cases but would be very slow and require a statistical ensemble of sea surfaces to build a reliable set of FS/MP statistics for analysis. |
| BURKHOLDER'S FORWARD-BACKWARD SHIP MULTIPATH METHOD |
| Dr. Richard Burkholder (Ohio State University's Electro-Sciences Lab) has been working on a multipath model using the forward-backward computational technique. This method is a modified MoM formulation that breaks the surface currents into two components: the currents induced by the incident field (forward component – essentially the physical optics approximation); and, the currents induced thru element interaction or re-radiation (the backward component). This technique then iteratively adjusts the incident field until the solution converges. Burkholder's method has provided some unvalidated predictions for selected 2-D problems at low frequencies (L-band with l ~ 1 m) and moderate look down angles (5° to 15°). However, for reasonably sized 3-D ship problems, this method becomes untenable with targets (ships) greater then 5 l cubed on seas greater then 50 l squared. This method also encounters shadowing difficulties and becomes unsuitable for the low grazing angles of interest (less then 5°). Burkholder's method also requires a statistical ensemble of sea surfaces. |

FIG. 6B

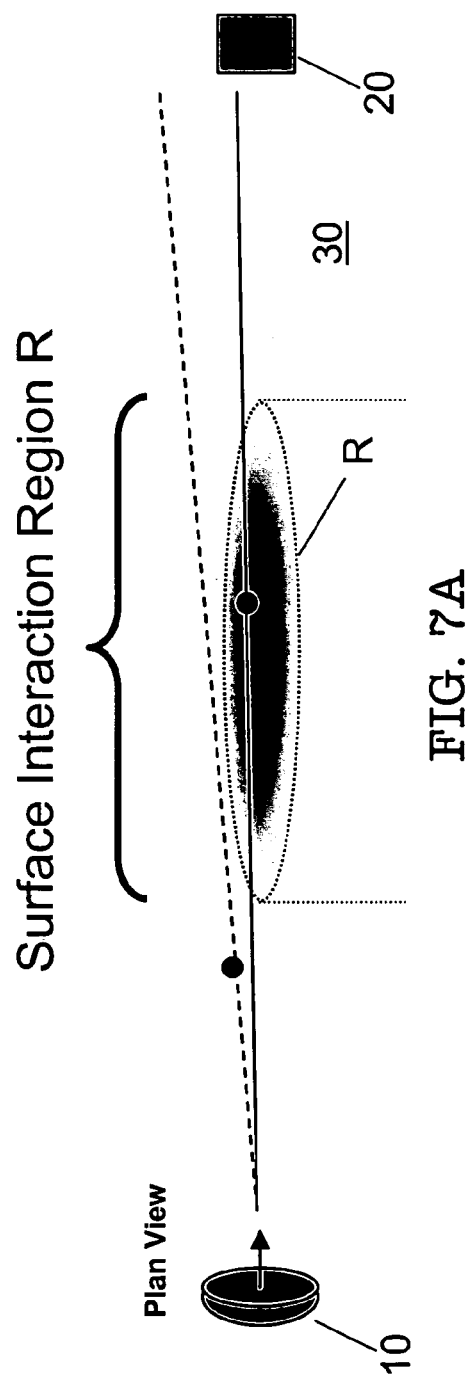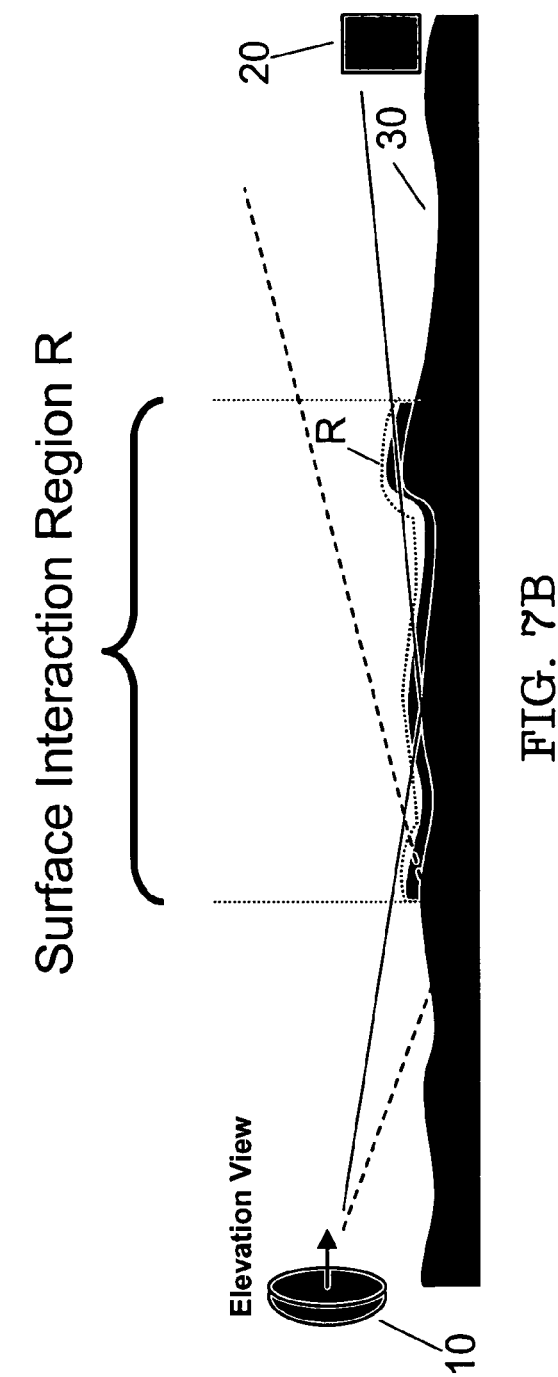

DUAL FORWARD SCATTERING METHOD FOR MODELING MULTIPATH PROPAGATION

CROSS-REFERENCE TO RELATED APPLICATIONS

This application claims the benefit of U.S. provisional application No. 60/475,778, filed 5 Jun. 2003, hereby incorporated herein by reference, entitled "Method for Modeling Multipath Propagation," sole inventor Jerry Rosson Smith, Jr.

This application also claims the benefit of U.S. provisional application No. 60/475,787, filed 5 Jun. 2003, hereby incorporated herein by reference, entitled "Method for Modeling a Surface Interaction Region," sole inventor Jerry Rosson Smith, Jr.

This application is related to the U.S. nonprovisional application being filed concurrently herewith, hereby incorporated herein by reference, entitled "Surface Interaction Region Methodology for Delimiting Multipath Propagation Inquiry," sole inventor Jerry Rosson Smith, Jr.

STATEMENT OF GOVERNMENT INTEREST

The invention described herein may be manufactured and used by or for the Government of the United States of America for governmental purposes without payment of any royalties thereon or therefor.

BACKGROUND OF THE INVENTION

The present invention relates to electromagnetic radiation, more particularly to methods and systems for analytically modeling electromagnetic (e.g., radio frequency) wave propagation between two or more locations.

When radar operates in the presence of any terrain or water surface, radar energy is reflected from that surface. For instance, when there are sea surface interactions, as radar energy propagates from the transmitter to the target and then back again, a portion of that radar energy impinges the sea, thus representing "sea surface interactions." The term "forward scattering" conventionally refers to the forward propagating energy that is scattered from the surface. Forward scattering is the portion of the sea interaction that scatters in the direction of radar propagation (either to the target or to the receiver). The term "back scattering" (also called "back scatter" or "sea clutter") conventionally refers to the radar energy from the transmitter that is scattered from the sea surface directly to the receiver. Sea clutter is a kind of environmental noise.

The term "multipath" conventionally refers to the physical phenomenon whereby electromagnetic energy propagates via multiple paths to the target and then returns via multiple paths. Multipath propagation by nature involves surface scattering. In the case of radar, for instance, radio waves propagate via multiple paths from a transmitter, reach a target, and return to a receiver via multiple paths. Forward scattering, as well as the direct path or line-of-sight, illuminates the target. The target then reradiates or scatters the incident radio frequency (RF) energy, and a portion of that energy returns to the receiver (via the direct path and another forward scattering path). According to the traditional "four-route" view, multipath is characterized by four paths taken by RF energy between the transmitter and receiver, viz.: (i) direct path-target-direct path; (ii) direct path-target-forward scatter; (iii) forward scatter-target-direct path; (iv) forward scatter-target-forward scatter.

There are several problems with the traditional four-route multipath notion. The four-route scheme combines everything into three propagation terms, viz., "direct path," "forward scatter" and "target." Reflectivity p is assumed equal for all paths; however, water's BRDF, for instance, is strongly angle dependent. The four-route view assumes reciprocity insofar as there being a point source on the departure path and a complex, distributed source on the return path. The four-route view ignores shadowing, wave direction, ducting, etc.; in particular, it assumes only one on-axis specular bounce. The four-route view treats scatterers each as a point scatterer, and thus neglects E-field deviation across the scatterer. The four-route view takes a frequency domain approach, thereby ignoring pulse spreading by path difference, and leaving unknown the sea surface scattering zone.

Currently there are no validated rigorous models for multipath. The dominant methodology of today adopts a physical optics approach that uses ray propagation methods for the direct paths and the forward scattered paths. The direct paths are well understood, but the forward scattered paths are each divided into two components, viz., a coherent portion and an incoherent portion. The coherent portion typically assumes that the terrain or sea is perfectly flat, which yields an analytic answer. The incoherent portion is a random term that does not have an analytic answer, and is typically determined from experimental data. Studies have shown that the experimental data matching cannot be easily extrapolated to terrain and sea surfaces other then those of the experiment; hence, this method is generally not applicable in the absence of a priori forward scattering knowledge.

Other multipath modeling methodologies, which are currently under development and not yet validated, attempt to rigorously solve the electromagnetic field equations at every point between the radar and target. This "total geometry" approach is mathematically valid; nevertheless, for problems of interest where ranges to targets are in the thousands of yards, this geometric manner becomes an untenably large problem to solve.

SUMMARY OF THE INVENTION

In view of the foregoing, it is an object of the present invention to provide an improved method for analytically modeling multipath electromagnetic (e.g., radar) propagation between two or more objects.

It is a further object of the present invention to provide a methodology that serves as basis or premise for facilitating analytic modeling or other investigation of multipath electromagnetic (e.g., radar) propagation between two or more objects.

The present invention actually includes two separate inventive methods, each of which is disclosed herein. The present inventor styles his first new method the "dual forward scattering" ("DFS") method. The present inventor styles his second new method the "surface interaction region" ("SIR") method. Both inventive methods not only are accurate but also are more practical, versatile and facile as compared with existing methods for making determinations pertaining to forward scattering and/or multipath. The inventive DFS method is advantageous over previous modeling approaches, which examined the more complex multipath phenomena, thereby complicating the problem computation. Moreover, the inventive SIR method is advantageous over previous approaches, which modeled enormous ocean regions (on the order of the target range squared), thereby rendering the problem computation untenable for 3-D applications. It is emphasized that either inventive method can be practiced in the absence of the other inventive method; nevertheless, some inventive embodiments efficaciously combine the two inventive methods. Either inventive method separately practiced, or both inventive methods practiced in conjunction, can effect either 2D or 3D modeling.

In accordance with typical DFS embodiments of the present invention, a method is provided for evaluating multipath propagation. The inventive DFS method comprises: (1) determining the incident field associated with a first forward scatter mode; (2) determining the scattered field of said target; and, (3) determining the received field associated with a second forward scatter mode. The first forward scatter mode is characterized as being from a transmitter to a target. The determination of the scattered field includes consideration of the incident field. The second forward scatter mode is characterized as being from the target to the receiver. Usually, the determination of the scattered field also includes consideration of the inherent propagative character of the target. According to many inventive embodiments, the inherent propagative character of the target includes the bistatic scattering cross section of the target. The determination of the incident field includes consideration of both a forward scatter component and a direct path component from the transmitter to the target, and the determination of the received field includes consideration of both a forward scatter component and a direct path component from the target to the transmitter. Frequent inventive practice provides for derivation of the received field from the incident field, based on the principle of reciprocity.

In accordance with typical SIR embodiments of the present invention, a method is provided for evaluating multipath propagation. The inventive SIR method comprises delimiting the evaluation of multipath propagation to a surface interactive region, the surface interaction region representing a portion of the surface existing between a transmitter-receiver and a target. The delimitation includes: (a) establishing a relationship between the down range time of the multipath propagation and the probability of error of the evaluation; and, (b) determining an interval of the relationship in accordance with a selected probability of error. The determined interval is indicative of the surface interaction region. According to usual inventive SIR practice, the delimitation further including association of the surface interaction region with the geometric configuration characterizing the transmitter-receiver and the target, wherein the association includes correlation of the down range time with the range distance.

The present invention's DFS method numerically and analytically models multipath as including two distinct forward scattering phenomena. The inventive DFS method models multipath as a series of forward scatterings (e.g., RF scattering for radar applications), viz.: a forward scattering to the target to determine the incident field; then, the scattering from the target; and finally, a forward scattering from the re-radiating target to the receiver. To elaborate: First, the energy is propagated from the transmitting radar to the target, and includes the radar-water-target forward scattering. Secondly, the combined field incident on the target is computed to include the direct path (line-of-sight) and the radar-water-target forward scattering. The target's scattered field is then calculated based on the combined incident field. Finally, the target's scattered field is propagated to the receiver, and includes the target-water-radar forward scattering. The received signal is then the combination of the re-radiated direct path and the target-water-radar forward scattering. Typical inventive practice thus comprises three basic steps, viz.: determining (e.g., calculating) the incident field; determining (e.g., calculating) the re-radiation; determining (e.g., calculating) the received field. Hence, according to typical embodiments of this inventive method, multipath is modeled as forward scatterings, wherein the inventive practitioner can utilize existing target scattering models.

The inventive DFS method reduces complications of multipath while improving target scattering calculations. According to inventive DFS principle, the incident at a target's boundary is determined by inventively developing a model for the total E-field at a point due to another point (point source) in the presence of a given sea surface. The complex incident field is transformed into a series of planes via plane wave decomposition. Using, e.g., the bistatic RCS distribution (calculated, e.g., with existing free-space RCS codes) and linear superposition, the free-space scattered field is then calculated. The scattered fields then undergo the same "forward scattering" process to determine the received field at the radar. The inventive DFS method accounts for non-plane wave incidence effects. The superposition principle and the plane wave decomposition permit calculation of both the first forward scatter and the second forward scatter in a manner that is independent of the target's radar cross section (RCS).

Further, according to the rudimentary formulation of the so-called "principle of reciprocity," absent attenuation effects of the surface, the transmitting antenna and the receiving antenna are interchangeable. Maxwell's Equations assume infinity of propagation in free space; therefore, in the absence of other factors, the principle of reciprocity applies. Based on the principle of reciprocity, some inventive embodiments provide for determination of the first (antenna-to-target) forward scattering, and the subsequent derivation therefrom, based on the principle of reciprocity, of the second (target-to-antenna) forward scattering; such inventive DFS embodiments thereby obviate a second calculation procedure dedicated to the second forward scattering.

The inventive DFS method is advantageous in several respects, including the following. Firstly, the total incident field on the target is used in the DFS calculation. The physical optics ("PO") method, by itself, does not accurately calculate this total incident field term. Without exact knowledge of this incident field, it is impossible to calculate the true scattered field of the target (whether in a multipath environment or in free-space).

Secondly, the forward scattering transfer function is reciprocal; hence, since the first forward scattering (also referred to herein as "F1") and the second (reverse) forward scattering (also referred to herein as "F2") are related to each other, the inventive practitioner needs to calculate only one (typically the first forward scattering) of these two scatterings for the geometry and configuration in question. This reduces total calculation time for the problem.

Thirdly, the calculation of the target in free space is a well defined problem, already addressed by a variety of known and available tools. In addition, according to typical inventive DFS embodiments, this information is generally known or obtained prior to solution of the multipath problem. This free space target calculation only needs to be done once for any geometric configuration of the target.

Fourthly, the present invention's DFS method accurately calculates the total multipath contribution without having to model both the scattering surface (e.g., terrain surface or sea surface) and the target simultaneously. Instead, only the forward scatter transfer function F1 needs to be calculated for the terrain/sea surface in question. This calculation can be done beforehand using any accurate forward scattering model. Once this transform and the bistatic scattering cross section are known, the actual multipath calculation becomes a fast and straightforward process. Furthermore, the forward scatter transform functions can be reused for other target geometries; thus, they only need to be calculated once for a specific terrain/sea surface and range-to-target.

In general, for most forward scattering and/or multipath scenarios, the ranges are many thousands of wavelengths, requiring very large regions of water (and/or land) to be modeled. The present invention's SIR method allows for modeling only the surface region that significantly contributes to the forward scattering, thereby reducing the modeled domain. This inventive "surface interaction region" (the region that significantly contributes to the forward scattering) is determined from experimental and numerical observations for given sea states and grazing angles. That is, based on analysis of empirical data, only a limited region of the water's surface is established as playing a significant role in forward scattering. By determining the geometry of that dominant region (i.e., the present invention's "surface interaction region"), and modeling only that dominant region, the computational space can be significantly reduced.

Typically, the inventive SIR model represents what is essentially a propagation model in marine environment. The SIR sizes and locations are functions of sea state, sea direction, range, and grazing angle. According to usual practice of the inventive SIR method, there is room for discretion by the inventive practitioner, as he/she must decide what contribution is "significant" to the forward scattering. The inventive SIR methodology can find SIR regions to suit the requisite degree of accuracy or, otherwise expressed, the acceptable degree of error. The present invention's SIR method is capable of quickly calculating the forward scatter component of the radiated field while including out-of-plane scattering effects. Further, the present invention's SIR method is 3-D capable, is capable of modeling an exact ocean surface, and is at least as accurate as existing methods while obviating the modeling of large areas (e.g., large patches of ocean).

Other objects, advantages and features of the present invention will become apparent from the following detailed description of the invention when considered in conjunction with the accompanying drawings.

BRIEF DESCRIPTION OF THE DRAWINGS

In order that the present invention may be clearly understood, it will now be described, by way of example, with reference to the accompanying drawings, wherein like characters indicate the same or similar components, and wherein:

FIG. 3A, FIG. 3B and FIG. 3C are diagrams that together illustrate typical embodiments in accordance with the present invention, which involve determination of: (i) forward scattering from the transmitting antenna to the target (FIG. 3A); (ii) scatter characteristics of the target (FIG. 3B); and, (iii) forward scattering from the target to the receiving antenna (FIG. 3C).

In FIG. 4A, FIG. 4B and FIG. 4C, the transmitting and receiving antennae are shown to be associated with a missile, and the target is shown to be a ship.

FIG. 3A through FIG. 3C and FIG. 4A through FIG. 4C, illustrates typical embodiments in accordance with the present invention. In addition, FIG. 5 shows how inventive practice can be delimited in its focus to a "surface interaction region."

FIG. 6A and FIG. 6B together constitute a tabular list of known propagation analysis techniques that can be implemented in inventive practice.

FIG. 7A and FIG. 7B are diagrammatic plan and elevation views, respectively, of multipath interaction between a transmitter-receiver and a target, particularly illustrating (similarly as shown in FIG. 5) how inventive practice can be delimited in its focus to a "surface interaction region."

FIG. 12 realistically portrays several forward scattering paths, which typically occurs in actual multipath scenarios.

DETAILED DESCRIPTION OF THE INVENTION

Figure 1:
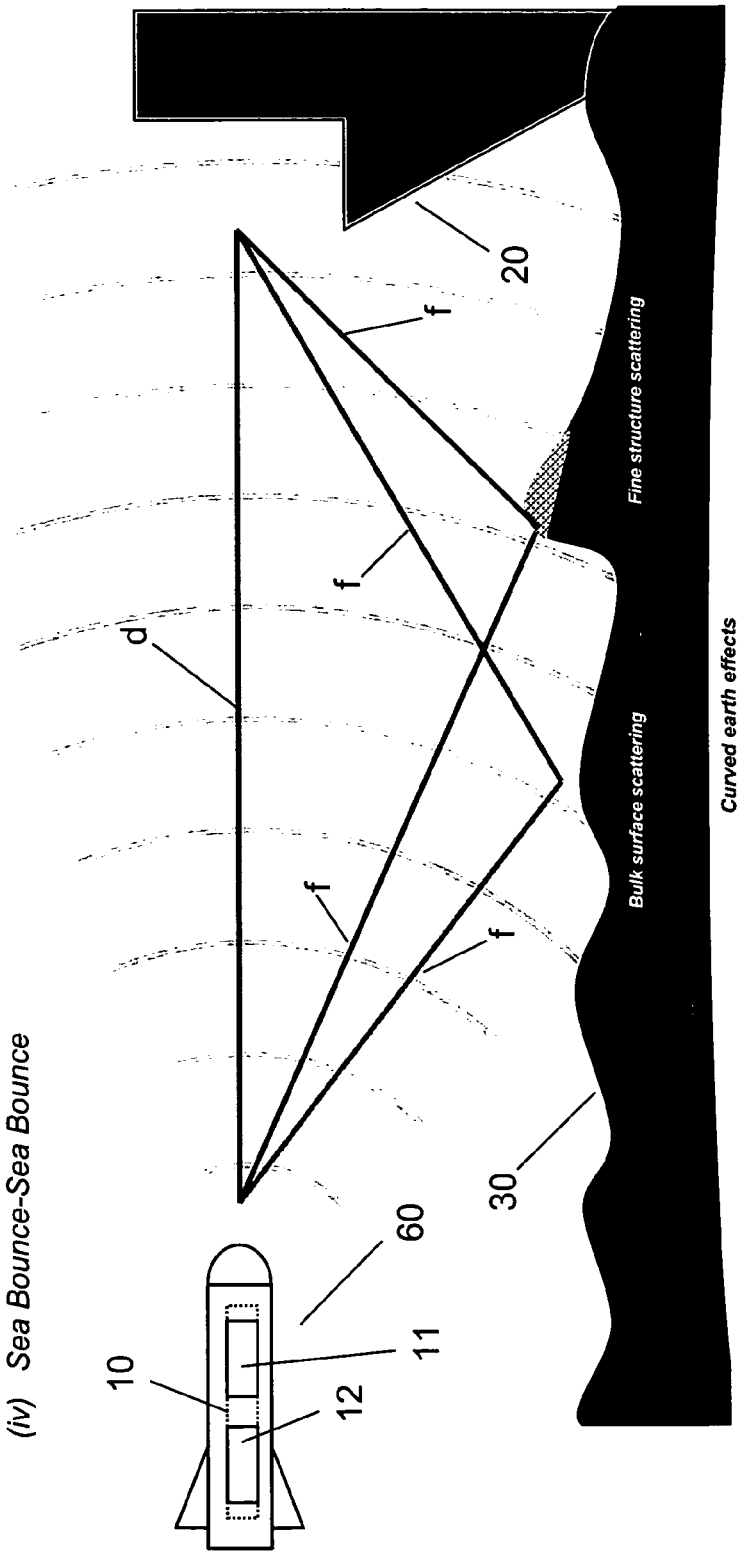
FIG. 1 is a diagram illustrating the traditional assumption that multipath electromagnetic wave propagation takes four basic route modes, viz., "direct-direct," "sea bounce-direct," "direct-sea bounce," and "sea bounce-sea bounce."
Figure 2B:
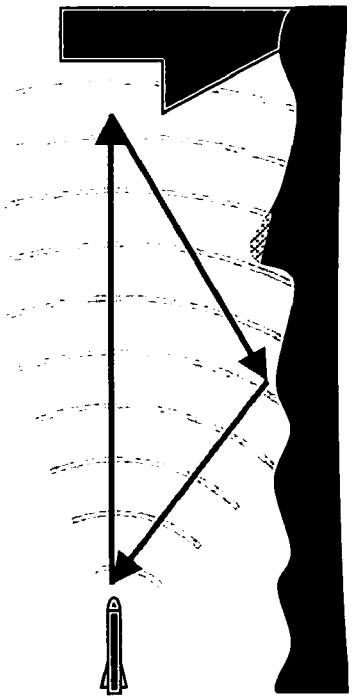
FIG. 2A, FIG. 2B, FIG. 2C and FIG. 2D are separate diagrams that illustratively break down the multipath propagation shown in FIG. 1 into its four basic route mode components, viz.: (i) direct propagation from transmitter-receiver to target, followed by direct propagation from target back to transmitter-receiver (FIG. 2A); (ii) direct propagation from transmitter-receiver to target, followed by forward scattering propagation from target back to transmitter-receiver (FIG. 2B); (iii) forward scattering propagation from transmitter-receiver to target, followed by direct propagation from target back to transmitter-receiver (FIG. 2C); and, (iv) forward scattering propagation from transmitter-receiver to target, followed by forward scattering propagation from target back to transmitter-receiver (FIG. 2D).
Figure 2D:
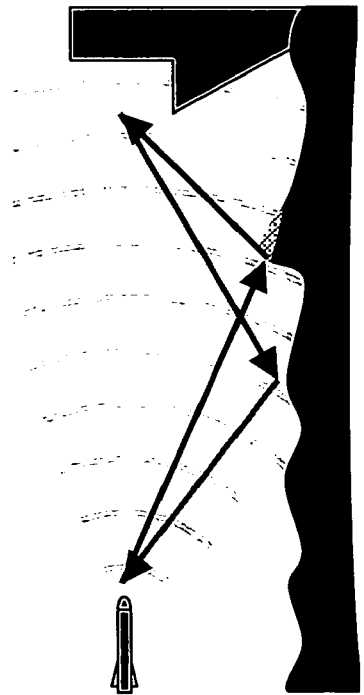
Figure 2A:
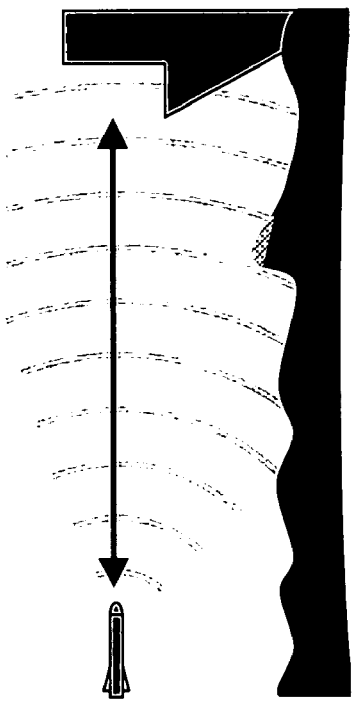
Figure 2C:
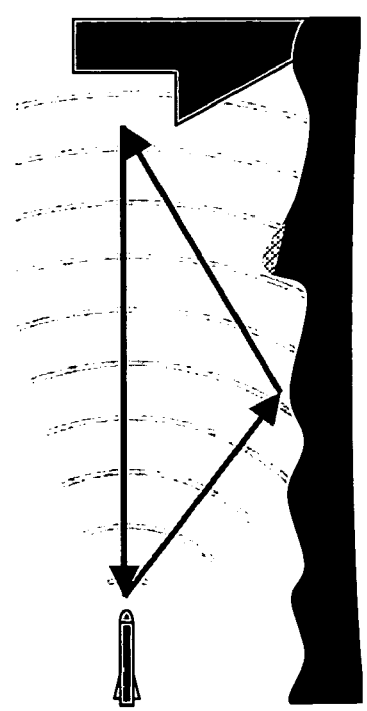
Figure 4A:
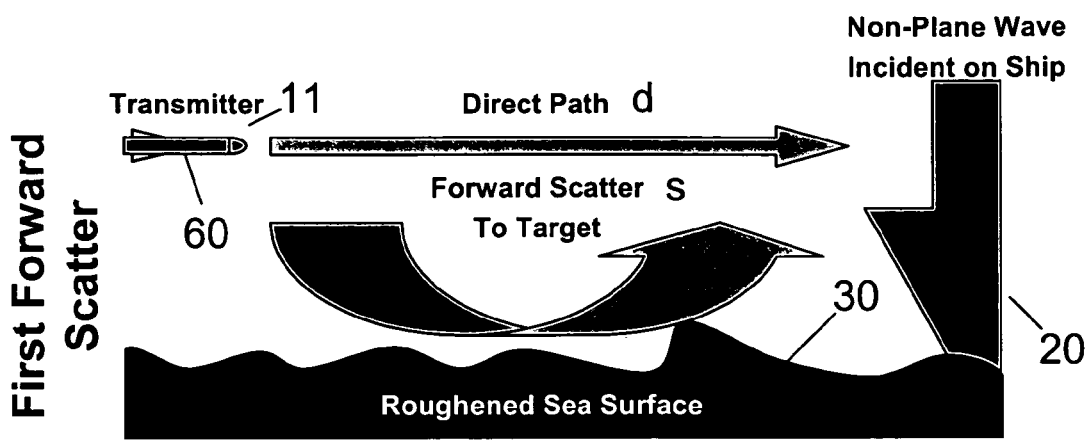
FIG. 4A, FIG. 4B and FIG. 4C are diagrams that, similarly as do FIG. 3A, FIG. 3B and FIG. 3C, together illustrate typical embodiments in accordance with the present invention.
Figure 4B:
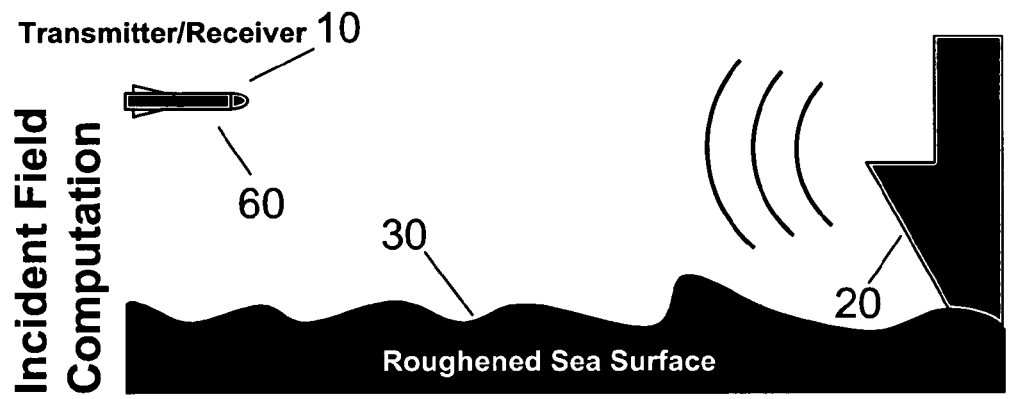
Figure 4C:
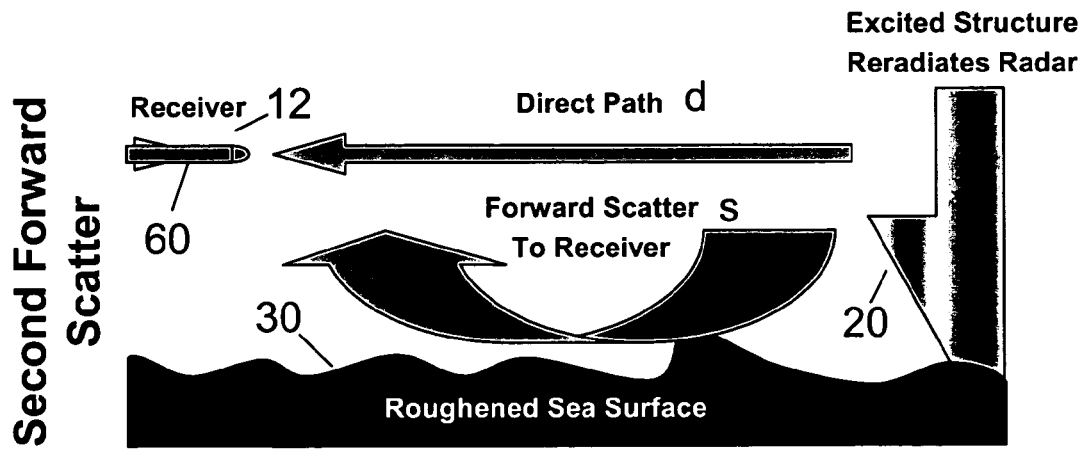
Figure 5:
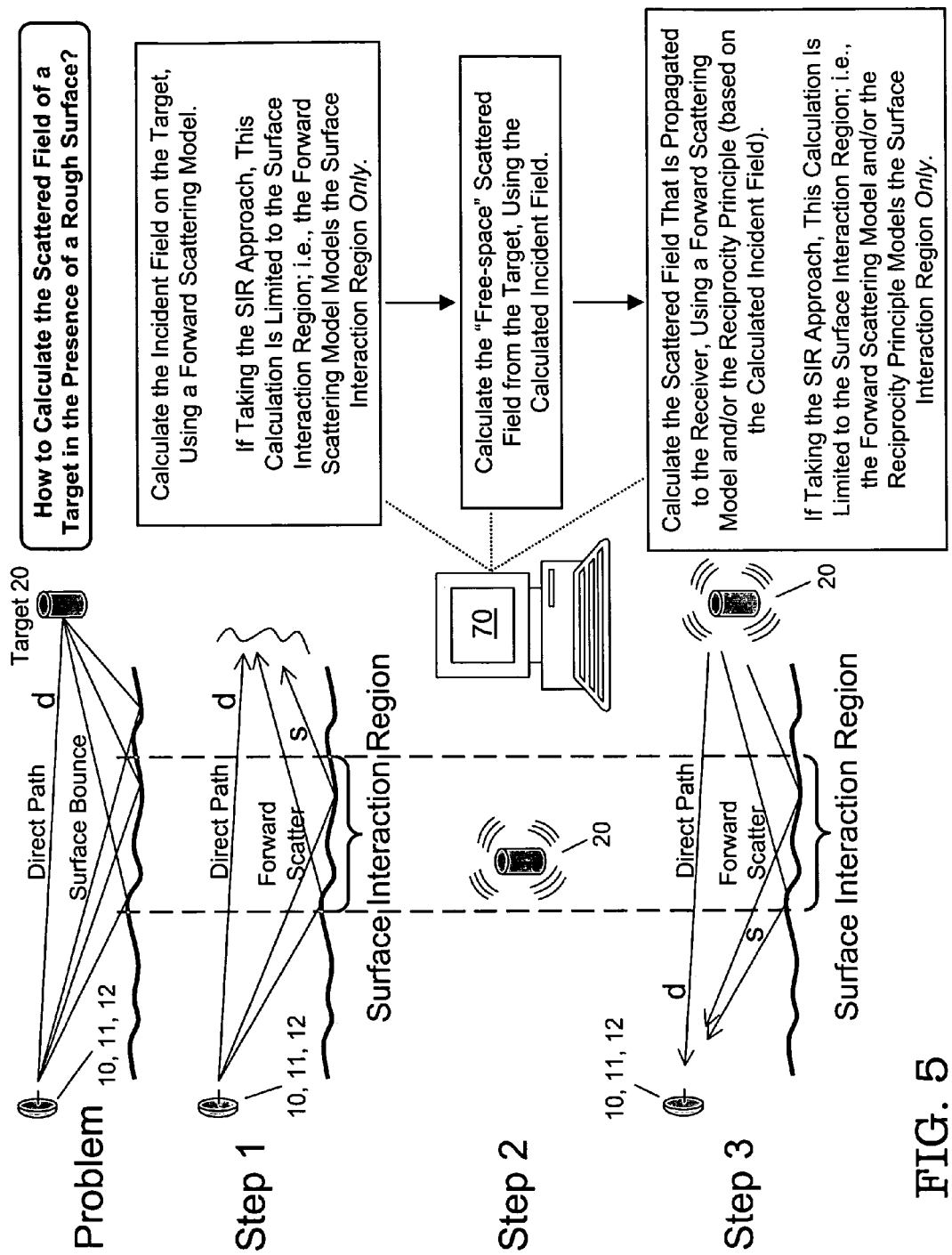
FIG. 5 is a diagram that, similarly as do

Referring now to FIG. 1 and to FIG. 2A through FIG. 2C, transmitter-receiver 10 includes transmitter 11 and receiver 12. The direct path d of radar from transmitter-receiver 10 (more specifically, transmitter 11) to target 20 represents the line of sight therebetween. A direct path calculation aims to find the free space portion of the incident field, i.e., that which the receiving target 20 would see in a free-space simulation. Forward scattering s from transmitter 11 to target 20 represents the deviation, in the incident field, relative to the direct path d field. A forward scattering s calculation aims to find the non-free space portion of the incident field. As depicted in FIG. 1 and FIG. 2A through FIG. 2C, transmitter-receiver 10 (which includes the combination of a transmitter 11 and a receiver 12) is the radar apparatus that is housed in a missile 60. Target 20 is a ship, and the scatter surface 30 is a sea surface (e.g., a "roughened" sea surface). In general, according to inventive practice, scatter surface 30 can be any surface, such as land surface or water surface.

Multipath propagation, according to four-route thinking, represents the collection of the following four distinct routes that radar takes during the time that the radar is sent by transmitter 11, reaches target 20, and is received by receiver 12: (i) direct path-ship-direct path, shown in FIG. 2A; (ii) direct path-ship-forward scattering (to receiver 10), shown in FIG. 2B, (iii) forward scattering to ship-ship-direct path, shown in FIG. 2C; and, (iv) forward scattering to ship-ship-forward scattering to receiver, shown in FIG. 2D. As shown in FIG. 2B through FIG. 2D, radar is "forward scattered," bouncing off scatter surface 30. Note the absence of scattered radar (bouncing of radar off scatter surface 30) in FIG. 2A, as distinguished from FIG. 2B through FIG. 2D. The paths shown in FIG. 2B and FIG. 2C are each known as a "one sea bounce path," while the path shown in FIG. 2D is known as a "two sea bounce path."

With reference to FIG. 3A, FIG. 3B, FIG. 3C, FIG. 4A, FIG. 4B, FIG. 4C and FIG. 5, the present invention's dual forward scattering (DFS) reduces or avoids the complexities of multipath phenomena by providing for three fundamental sequential steps, as follows: (1) determining the incident field (wherein incident field=direct path component+forward scatter component); (2) determining the scattered field (wherein, typically, such determination includes calculating the "free-space" RCS field due to the incident field); and, (3) determining the received field (wherein received field=direct path component+forward scatter component). The three inventive steps are elaborated upon in turn hereinbelow, in the context of multiscattering that is occurring in the presence of an ocean.

(1) Determine Incident Field

The forward scatter to the target is determined; that is, the forward scattered field is computed for the transmitter-target geometry. The transfer function F1(x,y,z) relates the total RF field incident at the point (x,y,z) on the target. This accurately gives the total incident field on the target, which is required for accurate calculation of the total scattered field. Note that the pseudo-physical optics (PPO) method does not accurately calculate this information.

(2) Determine Scattered Field

The free-space bistatic scattering cross section of the target can be calculated before or after step (1). In step (2), according to typical inventive embodiments, the total "bistatic scattering cross section" (also referred to herein as "bistatic cross section") for all of the scatterers of the target is computed. This bistatic cross section is computed for a plane wave of unit strength traveling in the direction $\theta_i$, $\phi_i$ and scattered in the direction $\theta_r$, $\phi_r$. The term "scatterer" includes (a) a scattered field portion due entirely to a single, non-interacting element and (b) a scattered field portion due entirely to the multi-bounce interaction of an ordered collection of elements. The phase and down-range location associated with each scatterer is included in the bistatic scattering cross section. It is important to note that this cross section (i.e., bistatic scattering cross section) is different from the traditional radar cross section (RCS), particularly because the phase and location of the individual scatterers are included in the bistatic scattering cross section. This bistatic scattering cross section, once calculated for all incident fields of interest, is archived for use (e.g., as a "fast-look-up" source) in calculating the total scattered field of the target.

Determination of the plane wave decomposition of the incident field includes treatment of the total incident field determined in step (1). The complex incident field calculated in step (1) is decomposed into a series of plane waves using existing plane wave decomposition techniques. This decomposition breaks the incident field into a series of plane waves for various strengths/phases incident on the target from various angles that, when superimposed, yield the complex incident field calculated in step (1).

Using the bistatic scattering cross section of the target for an arbitrary unit strength plane wave, previously calculated in step (2), quick calculation of the total scattered field of the target is performed by summing up the target's response to the plane wave decomposition, also earlier calculated in step (2). Thus obtained is the complex scattered field of the target.

(3) Determine Received Field

The forward scatter to the receiver is determined, using the complex scattered field of the target that has been calculated in step (2). Using this complex scattered field information, the scattering target is treated as a series of RF energy sources (wherein each scatterer is its own source with a unique location, phase, amplitude, and directivity). These sources then individually undergo a forward scattering calculation from the scatterer to the receiver (transfer function F2). The resultant fields at the receiver are then summed to give the total RF field at the receiver. This yields the total received field of the target in the presence of the scattering terrain or sea; hence this result includes the total multipath contribution.

Reference being made to FIG. 6A and FIG. 6B, various known propagation analysis techniques can be used in practicing the present invention. All three inventive steps can be performed using one or more known modeling techniques such as those set forth in FIG. 6A and FIG. 6B. The modeling techniques that can be inventively implemented for performing step (2) are better understood than are those pertaining to steps (1) and (3). Commercially available "free-space" scattering codes can be used for performing step (2); for instance, physical optics programming can be used to calculate the target's RCS distribution. Software codes are also available for facilitating steps (1) and (3), which are essentially identical insofar as involving computation of a forward scattering.

In the light of the instant disclosure, the ordinarily skilled artisan who seeks to practice the present invention will be capable of exercising discretion and proficiency in selecting from among known scattering regimes. According to known techniques such as exemplified by the pseudo-physic optics (PPO) method and the British version thereof, power is expressed as having (a) direct, (b) indirect coherent, and (c) indirect incoherent components. These so-called PPO techniques are more generally known as physical optics (PO) techniques. The total received power, which involves two forward scatterings, is $$P_{tot}=\|E(t_0)G_{direct}+2pE(t_1)G_{single}+p^2E(t_2)G_{double}\|^2 \qquad \text{Eqn. 1}$$

Within each term of the above Equation 1 is a coherent component and an incoherent component. The power expressed in terms of direct, coherent and incoherent signals is $$P_R = P_T(g_0 + g_1 D\rho_{coh} e^{-i\phi} e^{-i2k\Delta z/d} + \rho_{dif} e^{-i\xi})\qquad \text{Eqn. 2}$$

The coherent term in Equation 2 is generally treated with PO methods. The $\rho_{coh}$ term is Gaussian of infinite plate reflection. Equation 2 assumes that a two-bounce path is completely incoherent. The incoherent term is essentially guesstimated. The $\rho_{dif}$ term is currently under debate. The phase $\xi$ is considered random.

In addition to the known methodologies described in FIG. 6A and FIG. 6B, other methodologies, albeit not necessarily perfected or published, are under consideration. An example of an approach that is a work in progress is Zhang's High Frequency-Mode Expansion Method (HF-MEM). Dr. Yan Zhang (Jet Propulsion Laboratory) is developing a novel modification to the standard Method of Moments formulation of Maxwell's equations. See Yan Zhang et al., "Comparison of HF-MEM with Exact Solutions," DOT Volpe National Transportation Systems Center Progress Report, Contract No. N00014-01-F-0102, February 2002, incorporated herein by reference. By using a set of "well chosen" basis functions (similar to the FEM basis functions), Zhang is able to significantly reduce the mesh density at the expense of increasing the number of unknowns per element (essentially it is a high-order boundary element). Zhang has shown that, if the basis functions are chosen "wisely," equivalent accuracy to the MoM can be achieved with up to $\frac{1}{4}^{th}$ the number of unknowns (yielding a matrix $\frac{1}{16}^{th}$ the size of the MoM matrix). Due to Zhang's recasting of the governing integral equation, the solution matrix must be reconstructed for every new seeker location (e.g., as the radar moves closer to the target or changes viewing azimuth, the matrix must be reconstructed and resolved). Zhang has not yet developed a methodology for selecting the best basis functions, and his HF-MEM requires a statistical ensemble of sea surfaces. More recently, Zhang's research concentration has changed, and he is no longer pursuing developing the 2-D Modal Expansion Method.

The following references, each incorporated herein by reference, are informative on the British formulation of the Physical Optics (PO) equation: C. I. Beard, I. Katz, L. M. Spetner, "Phenomenological Vector Model of Microwave Reflection from the Ocean," *IRE Trans. Antennas & Propagat.*, April 1956, pp 162–167; C. I. Beard, "Behavior of Non-Rayleigh Statistics of Microwave Forward Scatter from a Random Water Surface," IEEE Trans. Antennas & Propagat., vol. AP-15, no. 5, September 1967, pp 649–657. The following acoustic reference, incorporated herein by reference, uses a Physical Optics modeling approach along with a "small angle approximation" method: R. Hashen, F. S. Henyey, D. Wurmser, "Calculations of Acoustic Scattering from the Ocean Surface," *J. Acoust. Soc. Am.*, vol. 88, no. 1, July 1990, pp. 310–323. The following references, each incorporated herein by reference, are informative on Burkholder's Forward Backward method: M. R. Pino, L. Landesa, J. L. Rodriguez, F. Obelleiro, R. J. Burkholder, "The Generalized Forward-Backward Method for Analyzing the Scattering from Targets on Ocean-like Rough Surfaces," *IEEE. Trans. Antennas & Propagat.*, vol. 47, no. 6, June 1999, pp 961–969; R. J. Burkholder, D. Colak, H. Kiper, "Numerical Investigation of the RCS of 2D and 3D Targets on a Rough Sea Surface," Ohio State University, ElectroScience Lab, TR 735231-2, January 2000. The following reference, incorporated herein by reference, is a text that is informative on the Finite Element Method (FEM)/Finite Element Analysis (FEA) in electromagnetics: M. Sadiku, *Numerical Techniques in Electromagnetics*, CRC Press, Boca Raton, Ann Arbor, London, Tokyo, 1992. The following reference, incorporated by reference, is a text that is informative in various technical areas that are pertinent to inventive practice: D. C. Jenn, *Radar and Laser Cross Section Engineering*, Washington, AIAA Press, 1995; see especially, p 18 (reciprocity theorem), pp 205–226 (geometric optics), pp 29–38 and 227–229 (physical optics), pp 85–126 (Method of Moments/Boundary Integral Method).

According to typical practice of the present invention's DFS method, outside analytical tools of two types are required, namely, (A) a forward scattering model (for the first and third steps), and (B) a free space scattering model (for the second step). These analytical devices are generally accessible in computer software form. Thus, the inventive DFS method will typically be practiced so that all three steps include use of one or more computer program products. Some inventive DFS embodiments provide for a comprehensive computer program product in accordance with the present invention, wherein all three method steps implement the computer program logic of the inventive program product. Some or all of the inventive DFS method can be practiced using computer means such as computer system 70 shown in FIG. 5.

A variety exists of commercially available computer program products that are each directed in a particular way to a free space scattering model. Any of these programs can be inventively implemented for effecting step (2) of the DFS method. For instance, the Naval Research Laboratory (NRL) uses physical optics (PO) software entitled "Radar Target Strength." Decaco Corp. manufactures a physical optics program entitled "X-Patch." UCRL uses a method of moments code entitled "NEC-4." McDonald-Douglas has a method of moments program entitled "CARLOS3D," Ansoft Corp. makes a finite element program entitled "HFSS." Most of the commercially available programs involve modeling technique along the lines of one or more of the techniques outlined in FIG. 6A and FIG. 6B. Similarly, inventive implementation in steps (1) and (3) of a forward scattering model (e.g., as pertains to a rough ocean) can effect one or more of the techniques outlined in FIG. 6A and FIG. 6B, such as involving physical optics, method of moments, etc. Either the forward scattering model or the free space model can be selected from among the techniques listed in FIG. 6A and FIG. 6B, or from among other known techniques not listed therein. In the light of the instant disclosure, the ordinarily skilled artisan will be capable of using known modeling technique(s) for practicing all three inventive steps.

Reference is now made to FIG. 7A, FIG. 7B, FIG. 8, FIG. 9A, FIG. 9B, FIG. 10, FIG. 11, FIG. 12 and FIG. 13. According to inventive embodiments in which the inventive DFS method and the inventive SIR method are combined, steps (1) and (3) of the inventive DFS method are facilitated through delimitation of the region of the ocean (and/or land) that is actually being modeled. Invocation of the present invention's surface interaction region (SIR) approach thus succeeds in reducing the subject surface region for purposes of practicing steps (1) and (3) of the inventive DFS method; that is, the surface interaction region only is modeled in both steps (1) and (3). The present inventor styles this inventive combinatorial strategy his "DFS-SIR" method. Essentially, the inventive SIR method is availed of in the forward scattering models of the inventive DFS method, i.e., in steps (1) and (3). As diagrammatically shown in FIG. 7A and FIG. 7B and graphically shown in FIG. 11 and FIG. 12, the "scattering surface"[1] is restricted to the surface interaction region S only.

The present invention's SIR methodology of forward scattering/multipath incorporates attributes of physical optic modeling (e.g., single point scattering point modeling) and total geometry modeling insofar as SIR limits the modeled surface (terrain and/or sea) to only that region where the forward scattered energy is important to the radar problem. That is, the inventive SIR method models only the region where scattered energy hits either the target 20 or the RF receiver 12. The existence of this surface interaction region is supported by experimental data of the forward scattering phenomena. The present invention's SIR modeling approach significantly reduces the computational complexity versus that of the total geometry methods because the inventive SIR method models only the forward scattering and multipath that are important to the problem at hand. This is inventively accomplished without loss of accuracy. Additionally, the inventive SIR method is more accurate then the known physical optics methods because the inventive SIR method models the actual physics of the problem in greater detail and does not require experimental data to predict the incoherent field components.

Figure 8:
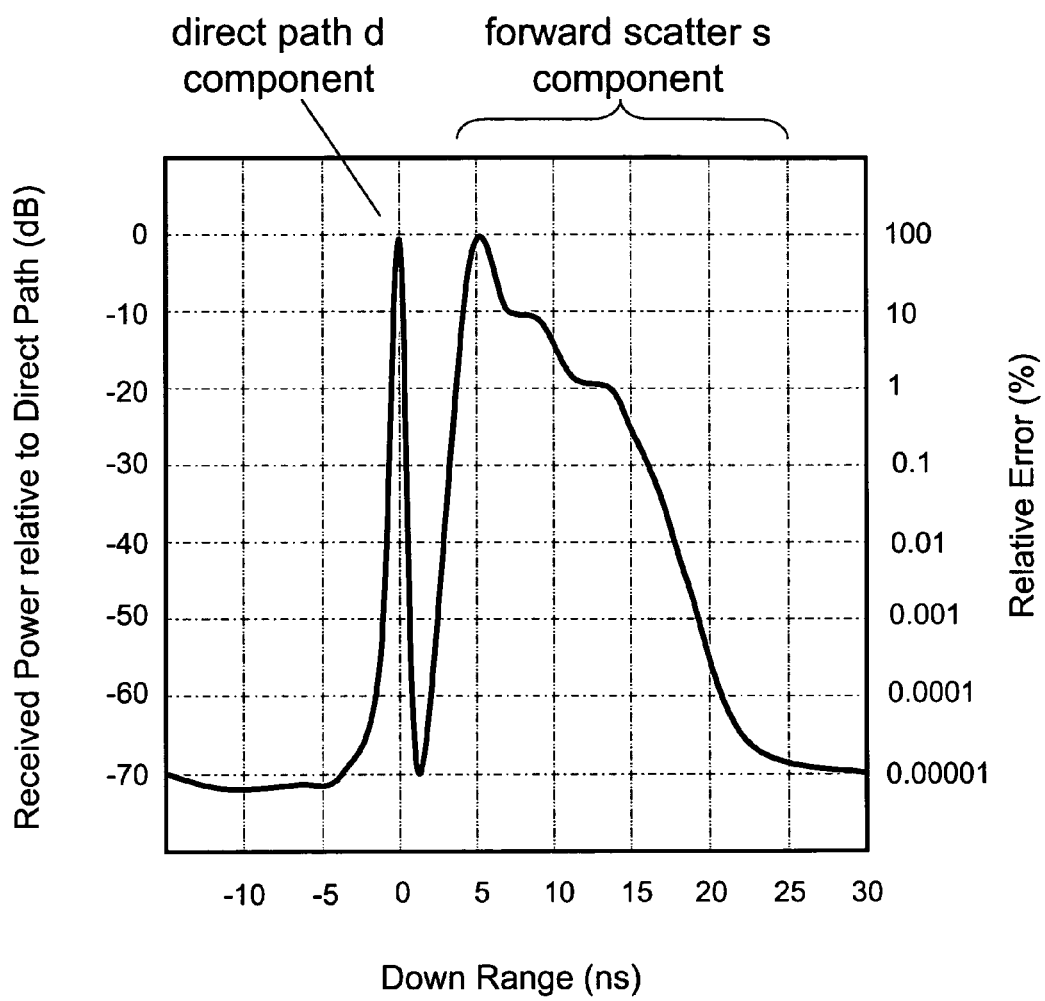
FIG. 8 is a graphical representation of a spatial down range plot.
Figure 9A:
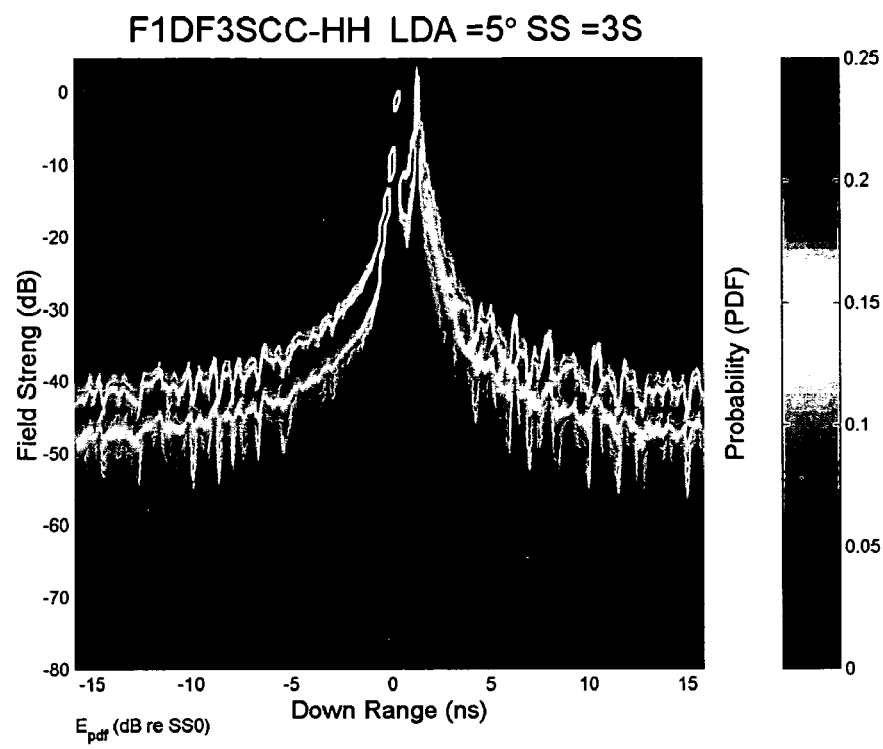
FIG. 9A and FIG. 9B are examples of empirically-based spatial down range plots similar to that shown in FIG. 8.
Figure 9B:
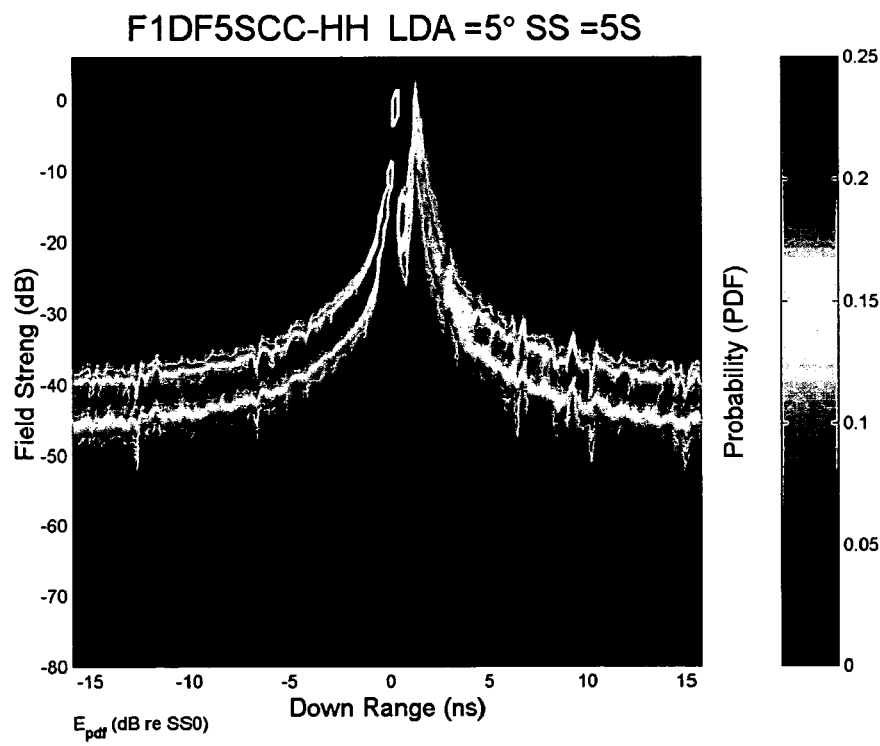
Figure 10:
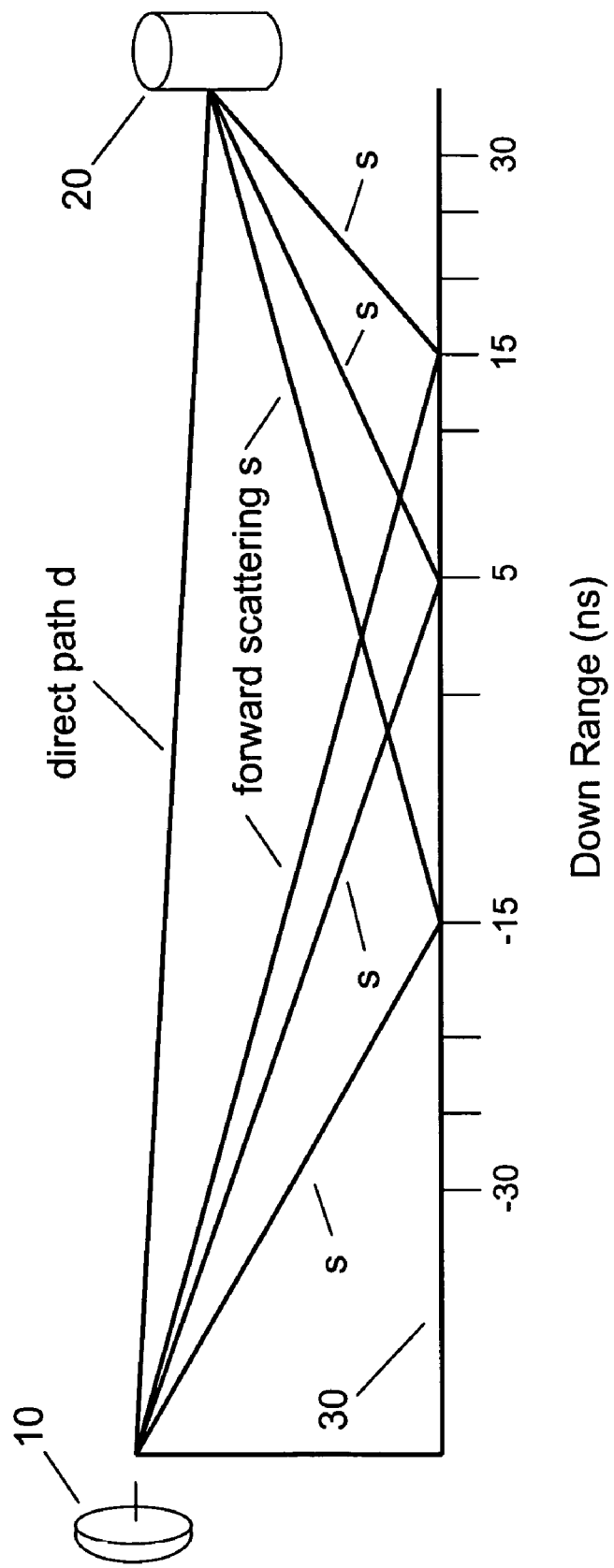
FIG. 10 is a graphical representation of a temporal down range plot, which can be derived from a spatial down range plot such as those shown in FIG. 8, FIG. 9A and FIG. 9B.

Spatial down range plots (expressed in terms of distance) are shown in FIG. 8, FIG. 9A and FIG. 9B. A temporal down range plot (expressed in terms of time) is shown in FIG. 10. A spatial down range plot displays the spatial profile of the received radar wave. The spatial profile can be converted to the temporal profile by properly scaling with the speed of light. The ordinarily skilled artisan is well acquainted with how spatial and temporal down range plots can be made. Any time-domain radar system or time-domain analysis method yields a radar signal in the time domain. A temporal down range plot is the time profile of the received power vs. time. For a frequency domain radar system or analysis method, the time down range plot can be generated by properly taking the inverse Fourier transform of the frequency domain data.

Figure 11:
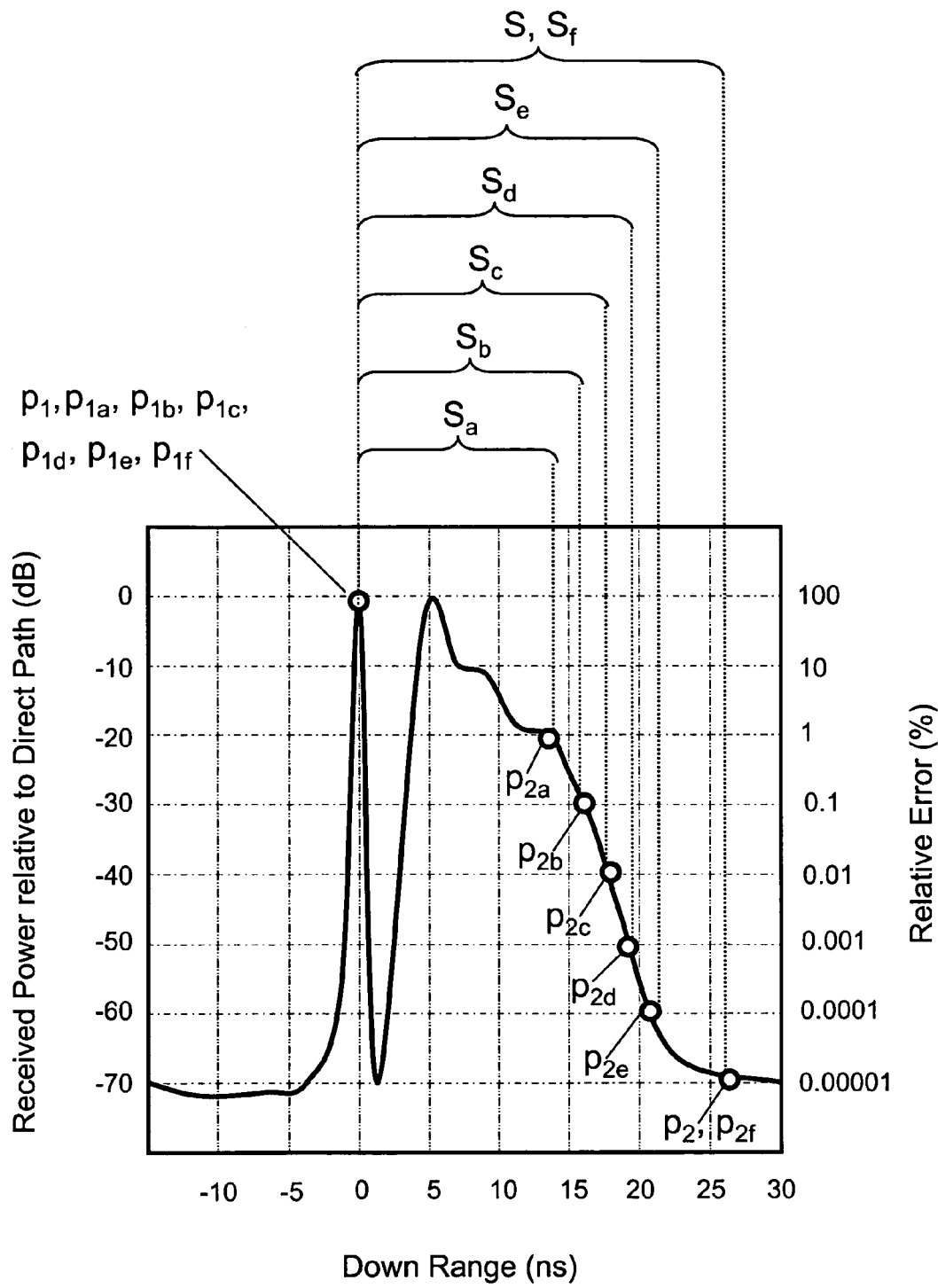
FIG. 11 is the graphical representation of the spatial down range plot shown in FIG. 8, amplified to illustrate various inventively determined surface interaction regions, such variability being in accordance with the practitioner's desired probability of error as indicated in the y-axis.

The present invention's SIR can be selectively determined in accordance with the degree of accuracy desired by the inventive practitioner. As shown in FIG. 8 and FIG. 11, the down range graph's vertical axis designations on the right-hand side indicate relative error in terms of percentage. A parallel correlation is seen between the relative error and the received power relative to the direct path. As depicted in FIG. 11, each point $p_1$ or $p_2$ represents the intersection of the plot itself with the horizontal line corresponding to a particular percentage error. Each error-specific horizontal line intersects the plot at two points, viz., point $p_1$ (on the lefthand side as shown in FIG. 11) and point $p_2$ (on the righthand side as shown in FIG. 11). The lower the percentage error, the greater the size and extent of the inventive SIR. In terms of linear distance, each SIR S represents a portion of the total distance R between transmitter-receiver 10 and target 20, wherein R is measured as the shortest distance between the respective vertical tangents (or tangent planes) of transmitter-receiver 10 and target 20. SIR $S_f$, corresponding to a 0.00001 percent error, approaches the optimal (least) error that is typically achievable in inventive practice. Points $p_{1f}$ and $p_{2f}$ represent the locations approximately at which the plot ceases its general plateau (reflecting a generally constant power value) and begins to curve upward (reflecting a significantly or appreciably increasing power value).

Figure 12:
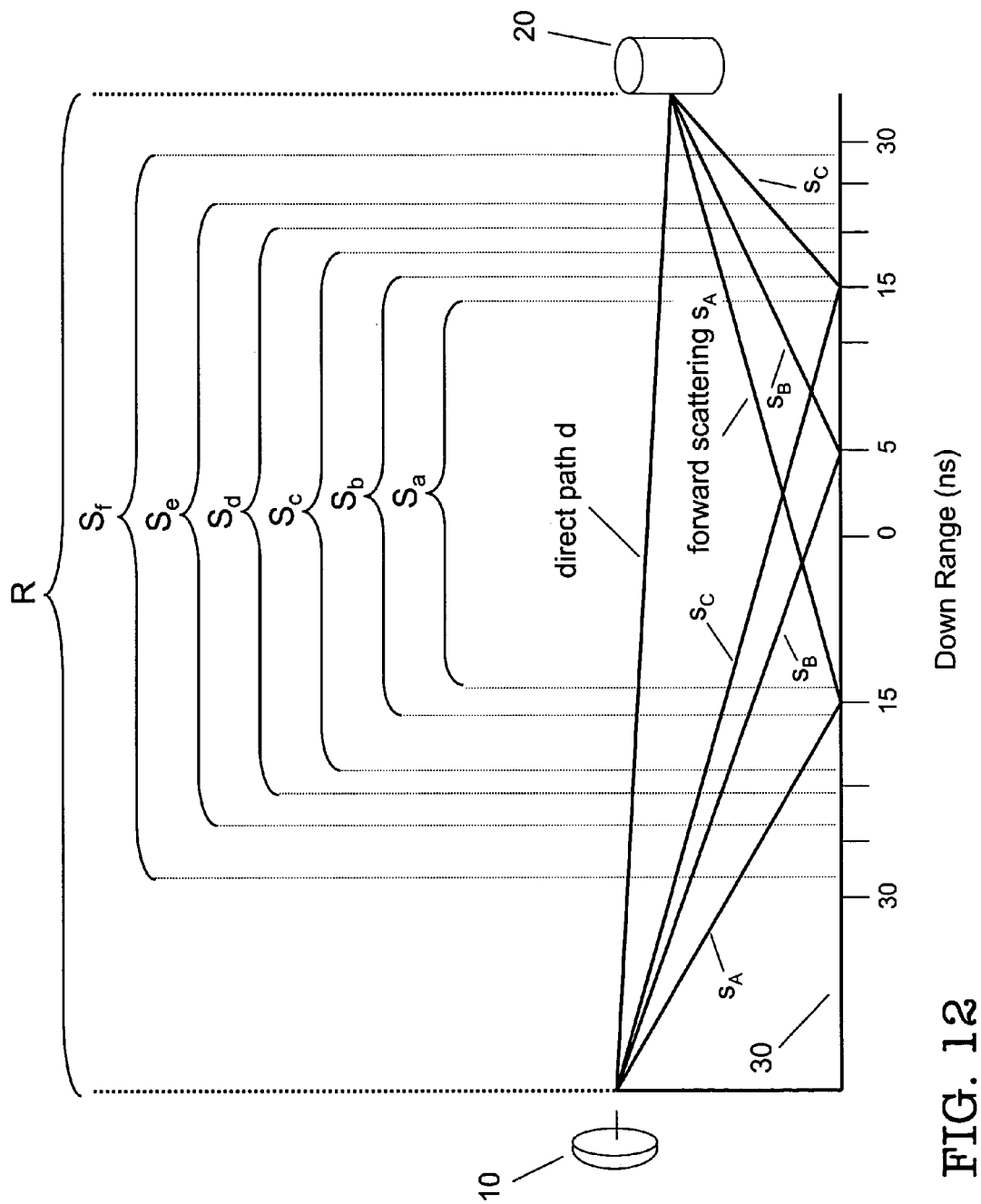
FIG. 12 and FIG. 13 are each essentially the graphical representation of the temporal down range plot shown in FIG. 10, but amplified to illustrate inventive determination of surface interaction regions and variation therof, such variability concording with the practitioner's desired probability of error as indicated in the y-axis of FIG. 11, such surface interaction regions being roughly commensurate with those shown in FIG. 11.
Figure 13:
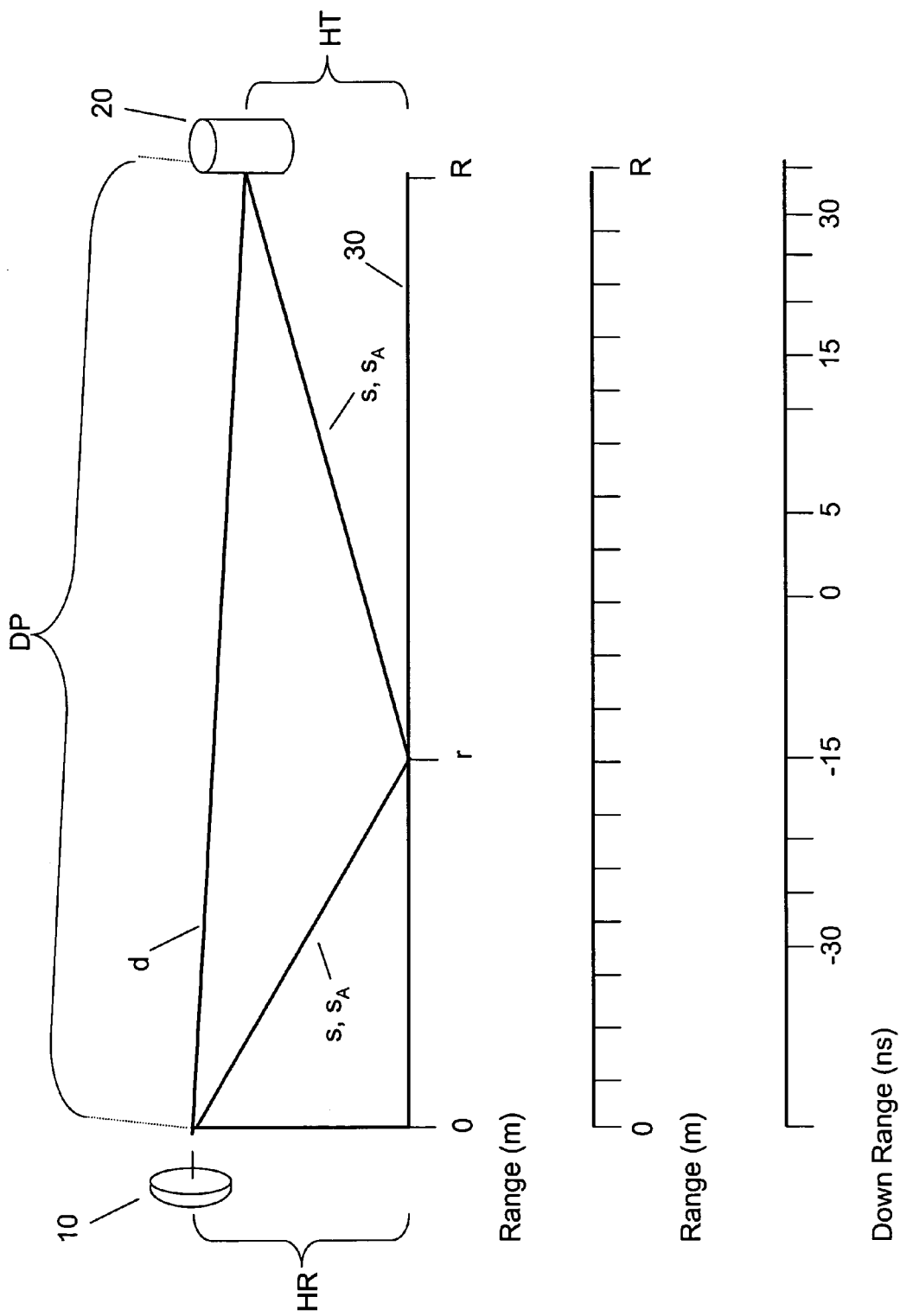

A temporal down range plot such as that shown in FIG. 10, FIG. 12 and FIG. 13 imparts geometric visualization to a spatial plot such as that shown in FIG. 8 and FIG. 11. FIG. 13 illustrates the correlation between range distance and down range time. A single forward scattering path s (which represents path $s_A$ shown in FIG. 12) is shown in FIG. 13 for illustrative purposes. FIG. 12 more shows three forward scattering paths $s_A$, $s_B$ and $s_C$, which is more in comportment with the realities of multipath propagation in the presence of an uneven surface. The SIR delineations that are shown with respect to time in nanoseconds in FIG. 11 are readily translatable as SIR delineations shown with respect to distance in meters, as shown in FIG. 12 and FIG. 13. In both the spatial plot of FIG. 11 and the temporal plot of FIG. 12, the horizontal axis is expressed in nanoseconds. Each SIR in the spatial plot is demarcated on the left as shown in FIG. 11 by a first vertical line drawn through both the corresponding point $p_1$ and the corresponding (lower) nanosecond value, and on the right as shown in FIG. 11 by a second vertical line drawn through both the corresponding point $p_2$ and the corresponding (higher) nanosecond value. Thus, each inventive SIR S has associated therewith its own pair of lower and higher nanosecond values. In order to translate an inventive SIR S from FIG. 11 to FIG. 12, the corresponding pair of lower and higher nanosecond values is located in FIG. 12, and then a vertical line is drawn through each nanosecond value.

If the inventive practitioner is satisfied with achieving a one percent error, the inventive SIR is delimited as illustrated by SIR $S_a$, wherein the points of intersection are points $p_{1a}$ and $p_{2a}$. To achieve a 0.1 percent error, the inventive SIR is delimited as illustrated by SIR $S_b$, wherein the points of intersection are points $p_{1b}$ and $p_{2b}$. For a 0.01 percent error, the inventive SIR is delimited as illustrated by SIR $S_c$, wherein the points of intersection are points $p_{1c}$ and $p_{2c}$. For a 0.001 percent error, the inventive SIR is delimited as illustrated by SIR $S_d$, wherein the points of intersection are points $p_{1d}$ and $p_{2d}$. For a 0.0001 percent error, the inventive SIR is delimited as illustrated by SIR $S_e$, wherein the points of intersection are points $p_{1e}$ and $p_{2e}$. For a 0.00001 percent error, the inventive SIR is delimited as illustrated by SIR $S_f$, wherein the points of intersection are points $p_{1f}$ and $p_{2f}$. Six SIRs and their corresponding point intersections are shown in FIG. 11 and FIG. 12 for illustrative purposes, as infinitely other error values (e.g., intervening error values such as 0.5, 0.05, 0.005, 0.0005, 0.00005, etc.) can also be selected in inventive practice. FIG. 11 and FIG. 12 are intended herein, not to portray precise renderings, but to be informative regarding the present invention.

Particularly with reference to FIG. 13, the down range spatial/temporal relationship for direct path d can be expressed as $$DP = c_0 DT \qquad \text{Eqn. 3}$$

where DP is the direct path down range distance, $c_0$ is the speed of electromagnetic radiation (e.g., light) in a vacuum, and DT is the down range time. Similarly, the down range spatial/temporal relationship for forward scattering path s is $$DF = c_0 DT \qquad \text{Eqn. 4}$$

where DF is the forward scattering path down range distance, $c_0$ is the speed of electromagnetic radiation (e.g., light) in a vacuum, and DT is the down range time. The direct path distance DP is given by $$DP = \sqrt{R^2 - (HR - HT)^2} \qquad \text{Eqn. 5}$$

where HR is the height of transmitter-receiver 10, HT is the height of target 20, and DP is the distance defined by direct path d. The forward scatter path distance DF(r) is the forward scatter path distance DF for a forward scatter path s that bounces off surface 30 at point r. B1(r) is the distance between antenna-receiver 10 and point r. B2(r) is the distance between target 20 and point r. Applying geometric principles, forward scatter path distance DF(r) can be obtained via Equations 6 through 8 as follows:

$$DF(r)=B1(r)+B2(r) \quad \text{Eqn. 6}$$

$$B1(r)=\sqrt{(HR)^2+r^2} \quad \text{Eqn. 7}$$

$$B2(r)=\sqrt{(Ht)^2+(R-r)^2} \quad \text{Eqn. 8}$$

In a two-dimensional modeling case the inventive SIR is determined as follows. The desired error is selected from the right (or left) vertical axis shown in FIG. 11. Down range time is designated on the horizontal axis shown in FIG. 11. The down range time DT associated with the selected error is determined. The distance DF is determined using Equation 3. The two extreme SIR bounce points r are determined by solving Equation 6 for r for the given HR, HT, R and DT. These two solution bounce points r represent the beginning and ending boundaries of the inventive SIR. In a three-dimensional modeling case a parallel procedure is followed, except that 3D geometric equations are used rather than 2D geometric equations. For a 3D case the solution boundary will be an ellipse, the inventive SIR thereby being elliptical such as shown in FIG. 7A.

Various figures herein depict a transmitter-receiver 10 in which a transmitter 11 and a receiver 12 are "mono-placed" (e.g., essentially comprising a single unit); that is, the receiving antenna 12 and the transmitting antenna 11 are proximate or collocated. Nevertheless, the present invention is also practicable when the receiving antenna 12 and the transmitting antenna 11 are "bi-placed" (e.g., distanced from each other). In other words, the present invention can be efficaciously practiced regardless of whether the application is of a "monostatic" nature or "bistatic" nature.

The ordinarily skilled artisan who reads this disclosure will understand how the inventive SIR methodology can be practiced in any situation wherein the propagation extends between two or more entities, such as: between a transmitter and a target; or, between a receiver and a target; or, between a transmitter and a receiver; or, between a transmitter, a receiver, and a target. In situations of propagation between a transmitter, a receiver, and a target, the inventive SIR method is practicable either when the transmitter and receiver are separated, or when the transmitter and receiver are collocated; in latter cases, the transmitter and receiver effectively represent a "transmitter-receiver," the propagation thus extending between the transmitter-receiver and the target.

Of particular note are situations wherein the waves propagate between a transmitter and a receiver, such as involving communications signals. The inventive SIR method is applicable to wireless communications, in the absence of a target, wherein the transmitter and the receiver are separated from each other—for instance, when a rough surface exists between the transmitter and the receiver. Examples of wireless communications are cellular communications, microwave communications, underwater acoustic communications, and radio communications. According to these inventive SIR embodiments, the inventive SIR methodology of determining the bounds of the SIR remains essentially as described hereinabove, except that the receiver replaces the target.

Although this disclosure emphasizes inventive practice in association with radio waves or other forms of electromagnetic radiation, the present invention is not so limited. Inventive principles are applicable not only in the realm of electromagnetism but also in the realms of acoustics and optics. In the light of the instant disclosure, acoustic and optical practice of the present invention, as well as electromagnetic practice of the present invention, will be understood by the ordinarily skilled artisan.

The present invention is not to be limited by the embodiments described or illustrated herein, which are given by way of example and not of limitation. Other embodiments of the present invention will be apparent to those skilled in the art from a consideration of this disclosure or from practice of the present invention disclosed herein. Various omissions, modifications and changes to the principles disclosed herein may be made by one skilled in the art without departing from the true scope and spirit of the present invention, which is indicated by the following claims.

What is claimed is:

1. A method for evaluating multipath propagation, said method comprising:
   determining the incident field associated with a first forward scatter mode, said first forward scatter mode being from a transmitter to a target;
   determining the scattered field of said target, said determining of said scattered field including considering said incident field; and
   determining the received field associated with a second forward scatter mode, said second forward scatter mode being from said target to said receiver.

2. The method of claim 1, said method further comprising delimiting the evaluation of multipath propagation to a surface interaction region, said surface interaction region representing a portion of the surface existing between said target and at least one of said transmitter and said receiver, wherein said delimiting includes:
   establishing a relationship between the down range time of said multipath propagation and the probability of error of said evaluation; and
   determining an interval of said relationship in accordance with a selected said probability of said error, said interval being indicative of said surface interaction region.

3. The method of claim 2, said delimiting further including associating said surface interaction region with the geometric configuration characterizing said target and at least one of said transmitter and said receiver, said associating including correlating said down range time with the range distance.

4. The method of claim 1, wherein said determining said scattered field further includes considering the inherent propagative character of said target.

5. The method of claim 4, wherein said inherent propagative character of said target includes the bistatic scattering cross section of said target.

6. The method of claim 1, wherein:
   said determining said incident field includes considering both a forward scatter component and a direct path component from said transmitter to said target; and
   said determining said received field includes considering both a forward scatter component and a direct path component from said target to said transmitter.

7. The method of claim 6, wherein said determining said received field includes deriving said received field from said incident field, said deriving being based on the principle of reciprocity.

8. The method of claim 6, wherein said determining of said scattered field further includes considering the inherent propagative character of said target.

9. The method of claim 8, wherein said inherent propagative character of said target includes the bistatic scattering cross section of said target.

10. The method of claim 8, wherein said determining said received field includes deriving said received field from said incident field, said deriving being based on the principle of reciprocity.

11. The method of claim 4, wherein said multipath propagation is of electromagnetic energy.

12. The method of claim 11, wherein:
said electromagnetic energy is radio frequency energy;
said transmitter is a radar transmitter; and
said receiver is a radar receiver.

13. The method of claim 4, wherein said multipath propagation is of acoustic energy.

14. The method of claim 4, said method further comprising delimiting the evaluation of multipath propagation to a surface interactive region, said surface interaction region representing a portion of the surface existing between said target and at least one of said transmitter and said receiver, wherein said delimiting includes:
establishing a relationship between the down range time of said multipath propagation and the probability of error of said evaluation; and
determining an interval of said relationship in accordance with a selected said probability of said error, said interval being indicative of said surface interaction region.

15. The method of claim 14, said delimiting further including associating said surface interaction region with the geometric configuration characterizing said target and at least one of said transmitter and said receiver, said associating including correlating said down range time with the range distance.

16. A computer program product for residence in memory of a computer, said computer program product being for evaluating multipath propagation, said computer program product comprising a computer useable medium having computer program logic recorded thereon, said computer program logic including:
means for enabling determination of the incident field associated with a first forward scatter mode, said first forward scatter mode being from a transmitter to a target;
means for enabling determination of the scattered field of said target, said means for enabling determination of said scattered field including means for enabling consideration of said incident field; and
means for enabling determination of the received field associated with a second forward scatter mode, said second forward scatter mode being from said target to said receiver.

17. The computer program product of claim 15, wherein:
said means for enabling determination of said scattered field further includes means for enabling consideration of the inherent propagative character of said target;
said means for enabling determination of said incident field includes means for enabling consideration of both a forward scatter component and a direct path component from said transmitter to said target; and
said means for enabling determination of said received field includes means for enabling consideration of both a forward scatter component and a direct path component from said target to said transmitter.

18. The computer program product of claim 17, wherein said inherent propagative character of said target includes the bistatic scattering cross section of said target.

19. The computer program product of claim 17, wherein said multipath propagation is of energy selected from the group consisting of electromagnetic energy and acoustic energy.

20. The computer program product of claim 17, said computer program logic further including means for enabling delimitation of the evaluation of multipath propagation to a surface interactive region, said surface interaction region representing a portion of the surface existing between said target and at least one of said transmitter and said receiver, wherein said means for enabling delimitation includes:
means for establishing a relationship between the down range time of said multipath propagation and the probability of error of said evaluation; and
means for determining an interval of said relationship in accordance with a selected said probability of said error, said interval being indicative of said surface interaction region.

* * * * *